United States Patent [19]
Tucker et al.

[11] Patent Number: 6,007,166
[45] Date of Patent: Dec. 28, 1999

[54] ENDLESS TRACK UNIT FOR FOUR-TRACKED VEHICLES

[75] Inventors: Emmitt M. Tucker, Ashland; Jasper J. Tucker, Jr., Medford; Maralee V. Sullivan, Ashland, all of Oreg.

[73] Assignee: Tucker Sno-Cat Corporation, Medford, Oreg.

[21] Appl. No.: 08/785,523

[22] Filed: Jan. 17, 1997

[51] Int. Cl.[6] .................................................. B62D 55/12
[52] U.S. Cl. .......................... 305/135; 305/108; 305/169; 305/199
[58] Field of Search ............................. 305/15, 108, 124, 305/125, 129, 135, 138, 165, 169, 195, 199

[56] References Cited

U.S. PATENT DOCUMENTS

| | | | |
|---|---|---|---|
| 2,984,120 | 5/1961 | Hurry | 305/169 X |
| 3,576,352 | 4/1971 | Sato et al. | 305/136 |
| 3,689,123 | 9/1972 | Barbieri | 305/15 X |
| 3,787,099 | 1/1974 | Tucker et al. | 305/135 |
| 3,857,616 | 12/1974 | Tucker et al. | 305/135 |
| 3,888,132 | 6/1975 | Russ, Sr. | 305/169 X |
| 3,924,905 | 12/1975 | Simmons | 305/108 |
| 3,938,606 | 2/1976 | Yancey | 305/135 X |
| 4,116,496 | 9/1978 | Scott | 305/108 |
| 4,218,932 | 8/1980 | McComber | 305/169 X |

FOREIGN PATENT DOCUMENTS 976213  10/1975  Canada .

OTHER PUBLICATIONS

Declaration of Jasper J. Tucker, Jr. dated May 6, 1997 (submitted concurrently herewith).

*Primary Examiner*—Russell D. Stormer
*Attorney, Agent, or Firm*—Klarquist Sparkman Campbell Leigh & Whinston, LLP

[57] ABSTRACT

An improved system in an endless track unit of an all-terrain vehicle. A track is driven with a drive wheel that has sprocket disks drivingly engaging the track with more than two teeth from those disks drivingly engaging the track at any given time. The track is trained around the drive wheel and a plurality of undriven guide wheels. A damper wheel may sit downstream of the drive wheel between the drive wheel and the first guide wheel and supports the underside of the track. A preferred embodiment has a sprocket disk with thirteen cogs that have a generally tear-shaped cross section forming teeth of the sprocket, more than two of which drivingly engage a stretch-resistant track at any given time. The track a continuous belt formed of molded rubber with stretch-resistant chords imbedded therein. A replaceable journal liner secured within an axle journal assembly, an improved guide wheel spindle that has a shoulder forming a bearing liner, and ice scrapers positioned on the inside of the track for removing built-up debris may also be installed to further improve operation of the endless track unit.

36 Claims, 8 Drawing Sheets

ENDLESS TRACK UNIT FOR FOUR-TRACKED VEHICLES

FIELD OF THE INVENTION

The present invention relates to all-terrain tracked vehicles, and more particularly to an improved endless track unit for four-track tracked vehicles.

BACKGROUND OF THE INVENTION

Endless track-driven vehicles are commonly used off-road in difficult terrain and under difficult terrain conditions such as in mud, snow, sand and tundra. For example, tracked vehicles are used in snow country for grooming ski slopes and snowmobile trails, for transporting skiers to back country slopes, for ski resort maintenance work, for snow and mountain rescue and for utility company maintenance work.

Tracked vehicles are generally of two types. Most tracked vehicles are of the two-track type, in which a pair of endless track units, one on each of the opposite sides of the vehicle, support and drive the vehicle. The other type is the four-track, in which four separately driven and independently suspended track units, two in front and two in the rear, support and drive the vehicle.

Four-track vehicles have certain advantages over two-track vehicles under extreme conditions such as on steep slopes and in very rough terrain because of the flexible independent suspension of the four-track units and the constant power available to all four-track units, even while turning. Unlike a two-track vehicle, which relies on the differential speed of the two tracks for turning, the four-track vehicle steers much like a wheeled vehicle. Its endless track units can be physically turned for steering.

Despite the advantages of four-track vehicles over two-track vehicles under extreme terrain conditions, the nature of four-track vehicles is such that there are several inherent problems with the existing designs.

First, there is an inherent problem in transmitting power to the tracks of the four track units. This problem arises because each track must be driven by a single drive wheel having a sprocket with teeth for drivingly engaging the track. The drive wheel receives power from the vehicle engine through a drive train that includes two differentials and four axle assemblies. The nature of the drive train and required vehicle ground clearance dictates that the drive wheel of each track unit be located at the apex of a generally triangular track configuration. All other track-supporting wheels of each track unit are idlers, i.e., undriven guide wheels. These guide wheels are spaced apart along the base of the triangular track unit from end to end thereof.

Ideally, the track that is trained about the drive wheel and guide wheels should be absolutely taut and, therefore, incapable of movement from its pitch line in a direction normal to the direction of the track run, i.e., the path of travel of the track about the drive sprocket and guide wheels. However, the known drive wheels often contribute to the track deviating from this ideal path.

Known drive wheels drivingly engage the track with two of fewer sprocket teeth. For example, the inventions in U.S. Pat. No. 3,787,099 and U.S. Pat. No. 3,857,616, issued Jan. 22, 1974 and Dec. 31, 1974, respectively, disclose using a seven tooth drive wheel; however, as best shown in FIG. 4 of each of those references, only two teeth ever drivingly engage the drive saddles of the track at any given time. With this limited interaction between the drive wheel and track, several problems arise.

For example, the known interaction of the track with the drive wheel on four track vehicles subjects the track to wide variations in applied forces as the track travels around its generally triangular-shaped track run. As a section of the track approaches the drive wheel at the apex of the generally triangular-shaped track run, it is pulled forward by a sprocket tooth, placing that section of the track in tension. Then, as the track travels over the apex, the sprocket tooth pushes that section of the track, rapidly placing it in compression. Because only a small section of the track is in contact with the drive wheel at any given time and the entire driving force is transferred from the engine to the track through this limited contact, the forces acting on the track at that point as well as those one or two sprocket teeth are not only variable, but extremely large.

This combination of large and rapidly varying forces applied to the track as it travels about the apex contributes to premature wear of the track and sprocket teeth and the propulsion related components, increase the amount of slack present in the track, and significantly decrease the fuel efficiency of the vehicle. Slack is also at its greatest at the downstream side of the single drive wheel, where the track is being pushed by the sprocket teeth rather than pulled.

Similarly, because of the limited number of teeth driving the track and the resultant large forces transferred to the track though and the increased slack associated with the premature wear of the track, when each tooth of the drive sprocket drivingly engages a portion of the track, there is a tendency for the sprocket tooth to drive the track downwardly about the sprocket, past the track's pitch line and out of the optimal track run. When this occurs, eventually the frictional engagement between each sprocket tooth and a corresponding portion of the track is overcome, and the engaged portion of the track suddenly releases itself from the engaged sprocket teeth and rebounds or "bounces" back toward and past the normal track run. This so-called "track bounce" sets up heavy track vibrations which are transmitted back through other track unit components to the vehicle chassis and body. Not only can track bounce be noisy, it can also make for an uncomfortable ride for the vehicle operator and any passengers, can limit the speed at which the vehicle may operate effectively, and can cause further premature wearing of parts, particularly in the track and other components of the track unit.

In extreme cases, track bounce can cause the track to skip a tooth of the drive sprocket in a phenomenon known as "track jump." When track jump occurs, there is a loss of power to the track, and this in turn may lead to a loss of vehicle control. The four-track vehicle shown in U.S. Pat. No. 3,787,099 would be especially subject to track bounce.

Second, known methods of positioning the idler wheels relative to the drive wheel create premature wear of the components involved. These methods consist of securing the idler wheels to spindles which are secured to a frame. The frame is then pivotally secured to a journal assembly on the drive wheel axle. The existing journal assemblies have a steel outer journal tube, rigidly secured to the frame, and a steel inner journal tube, operably secured to and supporting the drive sprocket wheel axle. The outer journal tube rotates about the inner journal tube permitting the frame to pivot about the axle. However, the steel rubbing against steel associated with this movement causes these journal tubes to abrade and leads to premature wear of these components, which are costly and difficult to replace.

Third, similarly, known methods of securing the idler wheels to their spindles results in excessive maintenance of the spindles. The known spindle is of a constant diameter along its length and secured to the frame at one end. The idler wheel is secured at the other end of the spindle by a nut with the wheel secured between bearing assemblies containing a seal ring, a seal and a bearing, one on each side of the wheel. In light of the dirt, sand, and snow in which the vehicle operates, this known design typically requires the idler wheels to be greased after approximately every eight hours of operation.

Fourth, in light of the environment in which four-track vehicles typically operate, it is common for ice, sand, mud or other debris to build up around the frame, including on top of the journal assembly. If this build-up goes unchecked, it can grow large and hard enough to disrupt the operation of the track about its path. In extreme cases, this built-up debris can derail the track from the vehicle.

Fifth, known four tracked vehicles typically leave a large and disruptive footprint in their path caused by the metal traction bars of the track becoming imbedded in the terrain and overturning the soil as the vehicle advances. Moreover, the large gaps in the known tracks, needed to permit the teeth of known drive wheels to properly engage the track, result in the track having a decreased surface area in contact with the ground. This smaller surface area combined with the weight of the vehicle permits the track to become deeply imbedded into the terrain during operation of the vehicle, and it thereby increases the damage to the terrain when the track is rapidly removed from the terrain as the vehicle passes by. As a result, even though a four-tracked vehicle may function efficiently in a wide variety of terrains, such a disruptive footprint often precludes these known vehicles from operating in environmentally sensitive and protected wildlife areas.

Following the introduction of four-track vehicles, various attempts were made to solve the first of these problems, namely attempting to reduce the likelihood of the track deviating from its ideal path. More specifically, these attempted solutions were aimed at preventing track bounce and track jump. However, these solutions were limited to implementing various support devices aimed at guiding and supporting the track along its ideal path. For example, shortly after the introduction of the vehicle shown in U.S. Pat. No. 3,787,099, so-called "slides" or "sliders" were installed in each track unit along the track run in the gaps between the drive sprocket and the endmost guide wheels. This alleviated the problem of track bounce and its consequential vibration somewhat, but not completely. The track bounce that still occurred slapped against the slider causing a loud noise and vibration which increased wear of the track.

In the mid-1980's, the sliders were replaced by damper wheels. A damper wheel was positioned on each of the opposite sides of the drive sprocket, in the gaps between the drive sprocket and the endmost guide wheels, with the upper peripheries of the damper wheels close to the track run. While the damper wheels eliminated the damaging track wear caused by the sliders and relieved track bounce somewhat, they did not eliminate track bounce and its attendant problems altogether. The damper wheels could not be positioned sufficiently close to the drive sprocket to eliminate substantial gaps between the damper wheels and sprocket wheel. As a result, the drive sprocket teeth would not disengage the track from the sprocket teeth before the teeth pulled the track downwardly out of the track run. Therefore, track bounce continued to occur when the sprocket teeth finally released the track in the gap on the downstream side of the drive sprocket. This gap could not be closed because of the conflict that would occur between the drive sprocket and the damper wheel axles. As a result, track bounce and its consequences continued to be a problem, even with damper wheels, in four-track vehicles.

More recently, a bridge member spanning between the damper wheels and the drive sprocket wheel has been added so that the uppermost surface of the bridge member and the upper periphery of the damper wheel actually define the track run in the vicinity of the apex of the generally triangular run. This bridge attempts to eliminate track bounce and track jump by forcing the track along the proper pitch line about the apex in spite of any sprocket teeth that may remain drivingly engaged with the track as it passes that point. While the bridge works effectively and is a significant improvement over prior designs, it also requires the addition of significant hardware to the existing design. Moreover, the bridge, like all the other proposed improvements to the four-tracked vehicles, does not address the other four problems with the known designs.

SUMMARY OF THE INVENTION

Accordingly, there remains a need for an improved track unit for four-track vehicles that will not only reduce the likelihood of track bounce and track jump without the addition of expensive track support hardware, but will also fulfill the foregoing needs. This is the primary objective of the invention. More specific objectives of the invention are to provide a track unit for a four-track vehicle that:

(1) eliminates track jump;

(2) substantially eliminates or reduces track bounce;

(3) reduces the overall variability and applied force acting on any particular section of the track at a given time;

(4) improves the reliability and maintainability of the track and the propulsion related components;

(5) improves the reliability and maintainability of the drive wheel axle journal assembly;

(6) improves the reliability and maintainability of the idler wheel spindle assemblies;

(7) reduces wear on drive components;

(8) improves the traction of the vehicle;

(9) reduces the vibration of the vehicle when operating on hard surfaces such that it may operate effectively at higher speeds;

(10) increases the fuel efficiency of the vehicle;

(11) prevents the disruptive build-up of snow, ice, mud, sand, and other debris on the frame and journal assembly;

(12) permits the vehicle to operate in environmentally sensitive areas without leaving a large footprint or adversely affecting the terrain;

(13) provides an improved track and drive wheel configuration to accomplish many of the foregoing objectives; and (14) provides a low cost, easy to maintain, reliable, relatively simple and inexpensive solution to the known problems of four-track vehicles.

The invention is an improved track unit for a four-track vehicle including a rotating drive sprocket wheel having more than two teeth drivingly engaging the track along its pitch line at the same time, thereby reducing and more evenly distributing the forces acting on a specific section of the track at any given time. To accommodate the increased number of sprocket teeth, the track has an increased number of traction bars and a decrease in the space between these bars, thereby improving the traction of the vehicle.

In a preferred embodiment, the drive sprocket wheel is formed from an aluminum disk with thirteen conforming shaped drive cogs positioned equal distance around the circumference of the disk, with each cog secured to the disk and extending perpendicular therefrom. Each cog has a generally tear-drop cross-section and forms a tooth of a sprocket for driving the track. For each track assembly, two disks are aligned along and secured to the drive axle. The track is a one piece endless molded rubber belt with internally cast composite stiffener rods running perpendicular to the track with internally cast stretch-resistent chords running parallel to the track path. Molded triangular shaped drive lugs on the inside of the belt engage the cogs for driving the track and also serve as wheel guides.

The preferred embodiment also includes a replaceable journal liner secured between the outer and inner journal tubes of the journal assembly, permitting easy repair and replacement of the liner rather than the entire journal assembly. An idler wheel spindle having a machined shoulder for receiving a set of bearings, reduces the number of parts required in the known assembly, permits the idler wheels to be preloaded during manufacturing, and increases the time between required greasing of the idler bearings from about 8 hours of operation to approximately 500 hours of operation. Ice scraping members secured to the track and extending toward the journal assembly during operation preclude excessive amounts of snow, ice, mud, or other debris from collecting on or around this assembly.

The foregoing and other objects, features and advantages of the invention will become more apparent from the following detailed description of preferred embodiments which proceeds with reference to the accompanying drawings.

DETAILED DESCRIPTION OF PREFERRED EMBODIMENTS

To provide a comprehensive disclosure without unduly lengthening this specification, applicants incorporate by reference the disclosures of U.S. Pat. Nos. 3,787,099 and 3,857,616.

Figure 1:
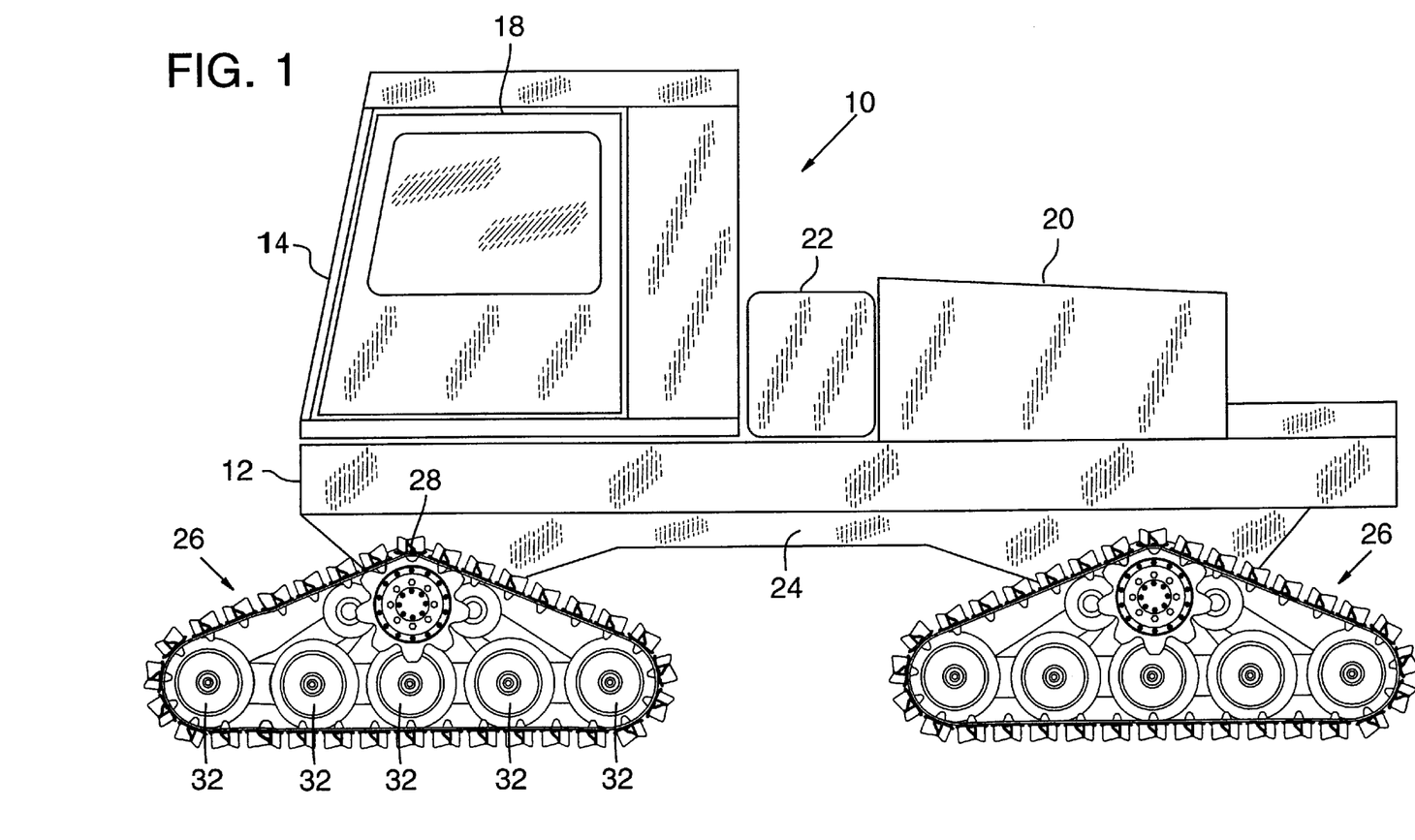
FIG. 1 is a side elevational view of a four-track all-terrain vehicle showing two of its four endless track units according to one preferred embodiment of the invention.

Referring to FIG. 1, a four-track all-terrain vehicle 10 is shown having a vehicle body 12 extending longitudinally of the all-terrain vehicle 10 from a front end 14 to a rear end 16. A cab 18, in which an operator sits, is located at the front end 14 and is mounted to the top of vehicle body 12. A suitable engine (not shown) within an engine housing 20 is mounted to the top of vehicle body 12 near the all-terrain vehicle's rear end 16. A fuel tank 22 for supplying fuel to the engine is mounted intermediate the engine housing 20 and the cab 18.

The vehicle body 12 is mounted on a chassis 24, which is substantially coextensive with the vehicle body 12. Four identical endless track units 26 (only two shown) support and are mounted to the chassis 24, two on opposite sides of the chassis 24 at the front of the vehicle and two on opposite sides of the chassis 24 at the rear of the vehicle. Each endless track unit 26 is independently mounted, driven and steerable in a well-known manner.

Additionally, the endless track units 26 are generally triangular shaped having an apex 28 with a track 30 trained around and supported by a plurality of undriven guide wheels 32.

Figure 2:
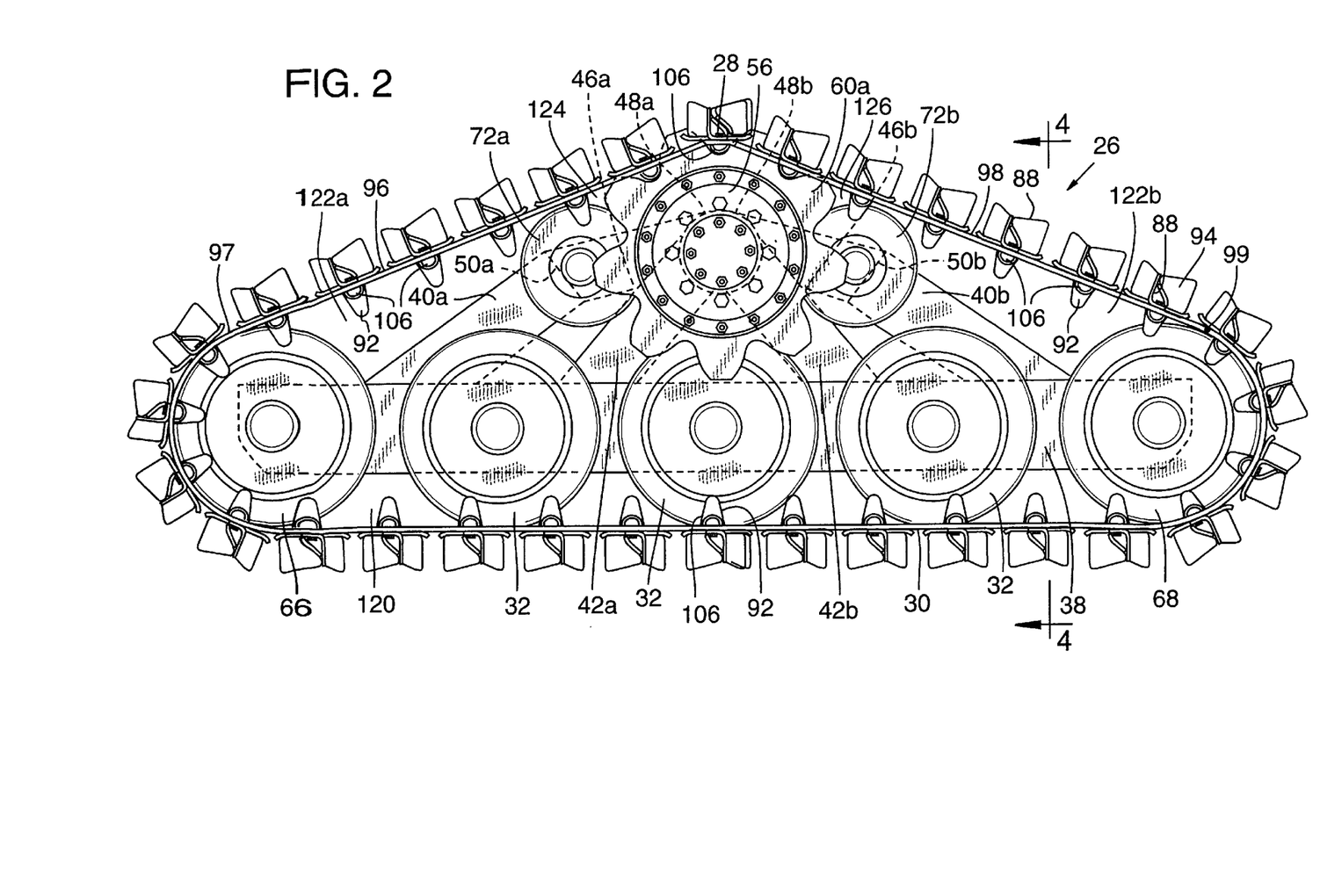
FIG. 2 is a side elevational view of an endless track unit of FIG. 1.
Figure 3:
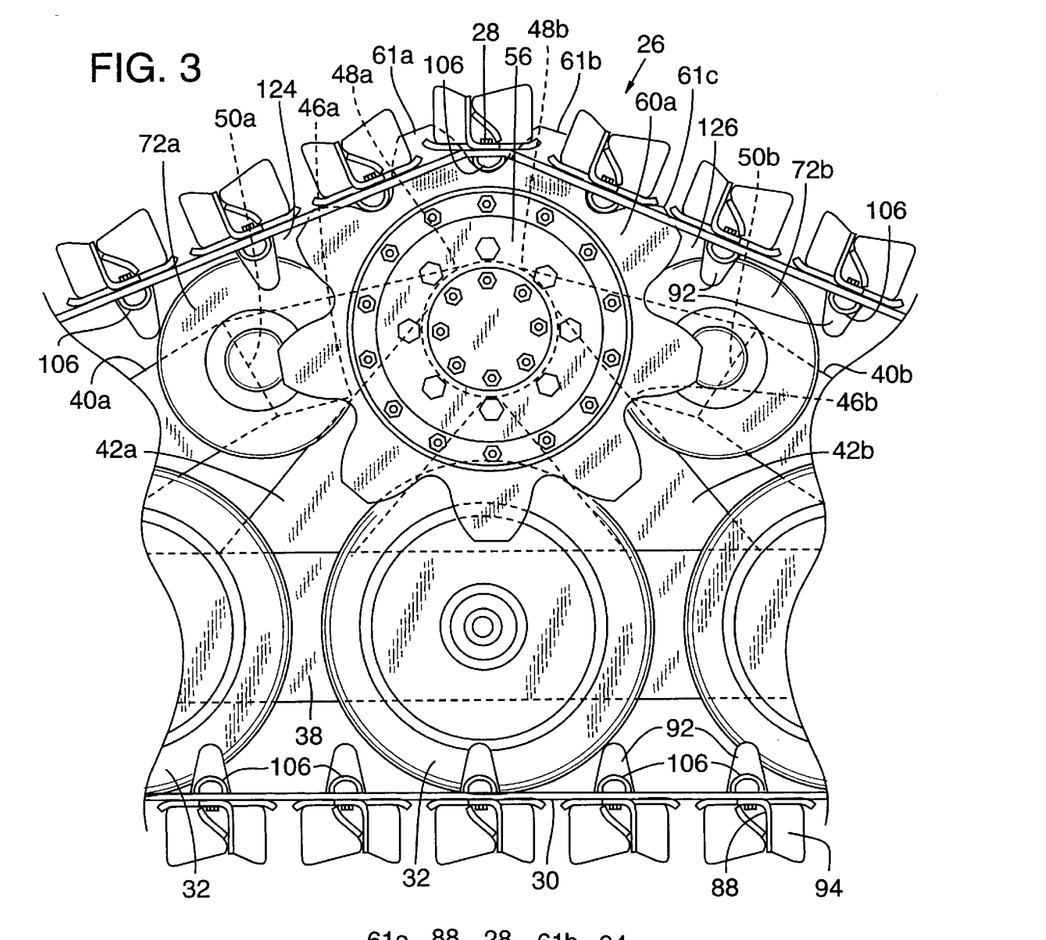
FIG. 3 is an enlarged fragmentary view of the endless track unit of FIG. 2.
Figure 4:
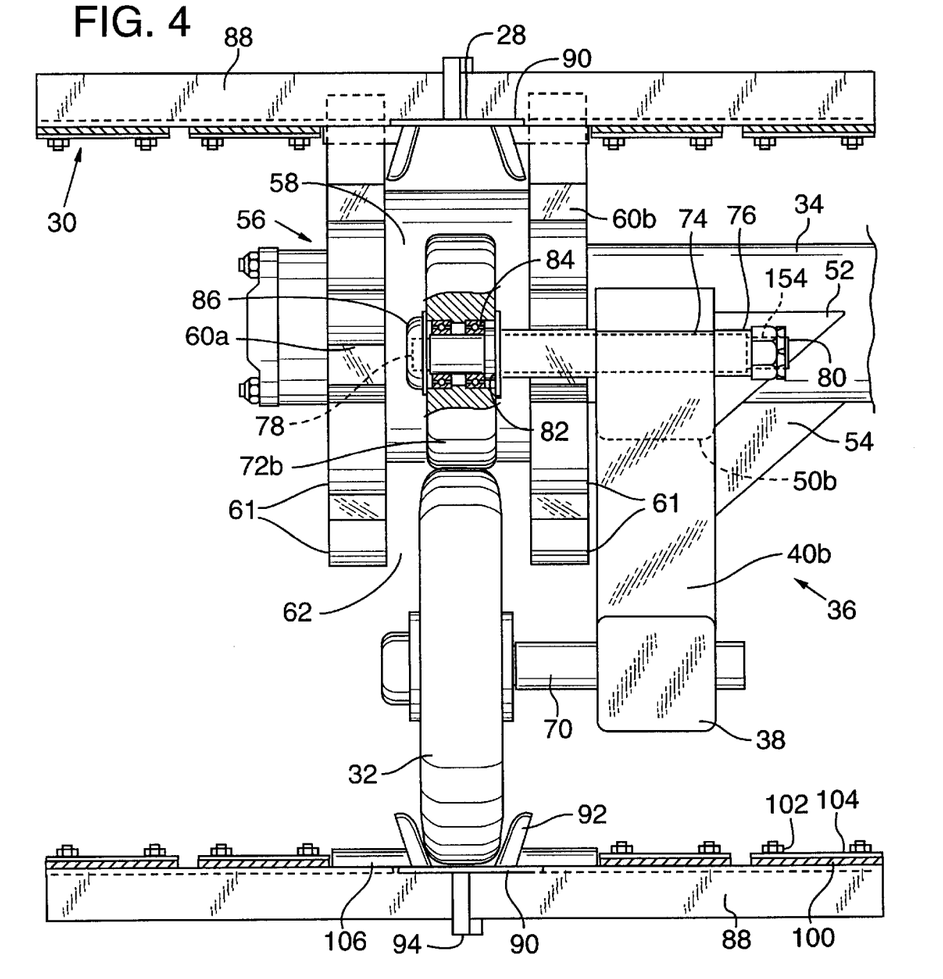
FIG. 4 is an enlarged cross-sectional view of the endless track unit taken along lines 4—4 of FIG. 2.

FIGS. 2, 3 and 4 show one of the endless track units 26 of a preferred embodiment in greater detail. The endless track unit 26 is mounted to the chassis 24 (FIG. 1) of the all-terrain vehicle 10 by a journal tube 34 (FIG. 4). A rigid frame 36 is mounted to journal tube 34. The frame 36 includes a cross beam 38 and two sets of diverging legs— outer legs 40a, 40b and inner legs 42a, 42b. The inner legs 42a, 42b are connected adjacent each other to journal tube 34 and diverge downwardly therefrom forming an inverted V-shaped configuration. The outer legs 40a, 40b include ends having lower parts 46a, 46b connected to the inner legs 42a, 42b, respectively, and upper parts 48a, 48b connected to journal tube 34. The outer legs 40a, 40b extend outwardly from the journal tube 34 and inner legs 42a, 42b before turning downwardly at bends 50a, 50b. The inner legs 42a, 42b are further supported by gussets 52 (one per leg, see FIG. 4) mounted to journal tube 34. Outer legs 40a, 40b are similarly supported by gussets 54 mounted to the journal tube 34. The inner and outer legs are connected at their lower ends to cross beam 38, which runs longitudinally of the endless track unit 26.

The endless track unit 26 has a drive wheel 56 located directly below and defining apex 28 of the generally triangular-shaped endless track unit 26. Drive wheel 56 is rotatably driven by an axle (not shown) within journal tube 34, the axle receiving power through a suitable transmission from the engine in a well-known manner.

The frame 36 pivots about the axle (not shown). Known carrier stops (not shown) secured to the frame 36, preferably one on each side of the journal tube 34 and extending upward to engage known parts (not shown) on the chassis 24 preclude pivotal or oscillatory motion of the frame 36 beyond desired limits. Each carrier stop is constructed, secured, and positioned in a well-known manner.

The drive wheel 56 includes a drum 58 with sprocket disks 60a, 60b mounted at either end of the drum 58 (FIG. 4). Each sprocket disk 60a, 60b has nine teeth 61 (FIG. 3), rather than the more conventional seven, and is preferably coated with polyurethane or rubber to prevent ice and other debris build-up on the sprocket disk during use. Opposed sprocket disks 60a, 60b are axially spaced-apart to form a gap 62 therebetween (FIG. 4).

Five lower undriven guide wheels 32 are equally spaced in a line along cross beam 38 of the triangular-shaped endless track unit 26 (FIG. 2) including a front guide wheel 66 at one end and a rear guide wheel 68 at an opposed end.

Guide wheels 32 rotate on guide wheel spindles 70 (FIG. 4) extending through an aperture in cross beam 38 and fixedly secured therein. Cross beam 38 maintains the guide wheels 32 in lateral and longitudinal alignment.

Two undriven damper wheels 72a, 72b, one on each side of the drive wheel 56, are mounted on damper wheel spindles 74 (FIG. 4, shown by dotted lines) fixedly secured within housings 76 (shown by solid lines). The housing 76 and spindles 74 extend through an aperture (not shown) in each supporting outer leg 40a, 40b and are fixedly secured therein. Damper wheel spindles 74 have opposed threaded ends 78, 80 or retaining pins (not shown) and a shoulder 82 near end 78. The damper wheels 72a, 72b are slidably mounted on the spindles and rotate on bearings 84 (FIG. 4) encircling the spindles and housed within the damper wheels 72a, 72b. The bearing and damper wheel assemblies are rotatably secured between shoulder 82 and a hub 86 threaded on end 78 of the spindle. Preferably, the damper wheels 72a, 72b will partially overlap sprocket disks 60a, 60b on drive wheel 56 by nesting as closely as possible to drum 58 within gap 62 between the sprocket disks 60a, 60b. This allows optimal performance as will be further described. Additionally, the damper wheels 72a, 72b are preferably made from a resilient material, such as rubber, to absorb vibration.

Track 30 is trained around the outside of drive wheel 56, damper wheels 72a, 72b and guide wheels 32 to form the generally triangular-shaped track run. A plurality of traction bars 88, preferably constructed of steel, extend laterally across the outside of track 30, the bars 88 being equally spaced around the track's periphery. Wheel guides 90 are centrally located on the track 30 and include ears 92 extending inwardly from traction bars 88. Guide wheels 32 pass between ears 92 and maintain a central alignment of track 30 as it passes over the guide wheels 32. Track fins 94, centrally located on the track 30, extend outwardly from traction bars 88 and provide enhanced traction for endless track unit 26.

As best shown in FIG. 2, an ideal downward pitch line 96 of track 30 is defined as a down-sloping straight line extending from the apex 28 to the a point 97 tangent to the upper portion of the front guide wheel 66. Similarly, an ideal upward pitch line 98 of track 30 is defined as an up-sloping straight line extending from a point 99 tangent to the upper portion of the rear guide wheel 68 to the apex 28.

Figure 3A:
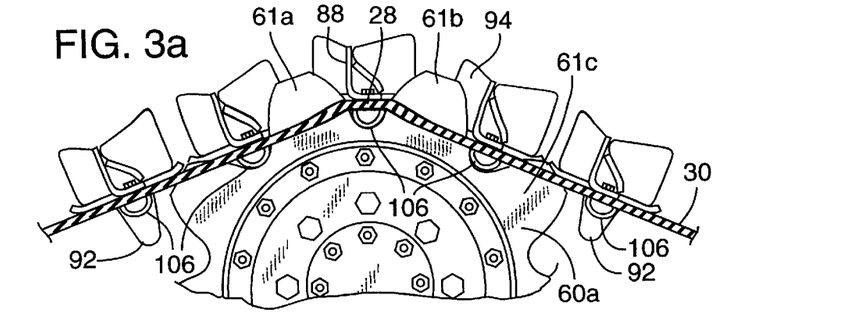
FIG. 3A is an enlarged fragmentary view showing the upper portion of the endless track unit of FIG. 3.
Figure 4A:
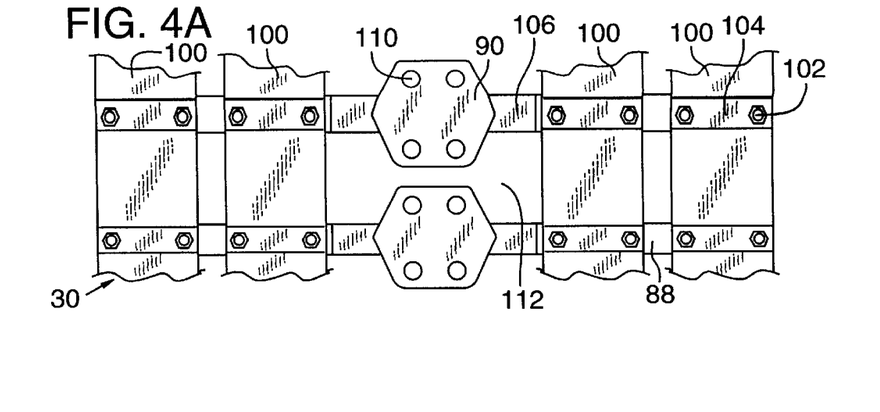
FIG. 4A is a top view of the track of FIG. 4.

FIGS. 4 and 4A show track 30 in greater detail. The track 30 comprises four track belts 100, preferably constructed of rubber, two on each side of the centrally located track fin 94. Traction bars 88 are attached to track belts 100 by bolts 102 which extend through washer strips 104 bearing against the belt's back side. A rigid drive saddle 106, preferably having a cross-section shaped to tightly mesh between the teeth 61 of the sprocket disk 60a, 60b as best shown in FIG. 3A, is secured, preferably by welding, to a traction bar 88 on either side of track fin 94 (FIG. 4 and 4A). Holes 110 extending through wheel guides 90 permit mud and snow to escape and prevent undesirable buildup thereof on the working surfaces of the ramps. Openings 112 formed between track belts 100 and wheel guides 90 allow the teeth 61 on the sprocket disks 60a, 60b to mesh with the drive saddle 106 and thus drive track 30.

All of the described wheels maintain track 30 in a generally triangular track run. However, there are gaps or voids where the track 30 is not supported by any of the above-described wheels. Most of these gaps 120 (FIG. 2) are located along the base of the triangular endless track unit 26 between guide wheels 32. A first pair of larger leg gaps 122a, 122b is located along the legs of the endless track unit 26 between damper wheels 72a, 72b and the front and rear guide wheels 66, 68, respectively. A second pair of leg gaps 124, 126 is located one between the damper wheels 72a, 72b and drive wheel 56.

As already mentioned, the damper wheels 72a, 72b are positioned as closely as possible to the drum 58 of the sprocket disks 60a, 60b. Downstream damper wheel 72a is located slightly below the downward pitch line 96 of the track 30, and upstream damper wheel 72b is located slightly below the upward pitch line 98 of the track 30. This minimizes the gaps 124, 126 located between damper wheels 72a, 72b and drive wheel 56. In cases where the track 30 has elongated to the point where it has a significant amount of slack in it and therefore the track 30 sags below its ideal pitch lines 96, 98, during operation of the all-terrain vehicle 10, the downstream damper wheel 72b gradually raises the track 30 from larger gap 122b to the proper pitch line, aligning the track in proper position to be received by the drive wheel 56. Similarly, as the track passes over the apex 28, the downstream damper wheel 72a gradually lowers the track 30 from the proper pitch line into larger gap 122a, thereby helping to keep the track 30 in proper alignment with the meshing teeth of the drive wheel 56. However, these gaps cannot be entirely closed because of the conflict that would occur between the drive sprocket and the damper wheel axles.

Previously, in light of the general resiliency of the track 30 and its tendency to elongate with wear, it was thought that if track 30 is left unsupported over these gaps, track bounce will occur because sprocket disks 60a, 60b have difficulty disengaging the track due to friction. Accordingly, various devices, such as slides and bridges, were devised to fill the remaining gaps but still allow the track 30 to follow its optimal path along its pitch lines 96, 98. Means for improving the meshing of the sprocket disks 60a, 60b with track 30 had largely been left unexplored.

However, during operation of the all-terrain vehicle 10, the teeth of the sprocket disks 60a, 60b drivingly engage the track 30 only in the vicinity of the extreme apex 28 of the generally triangular track run. Known means for engaging the sprocket disks 60a, 60b with track 30 permit at least one tooth of the sprocket disks 60a, 60b to remain drivingly engaged with track 30 below the ideal pitch lines 96, 98 of the track 30. Normally, the track is not as taut as shown in FIG. 2. Instead, the track slightly sags under the weight of the traction bars 88 in larger gaps 122a, 122b between damper wheel 72a and front guide wheel 66 and between damper wheel 72b and rear guide wheel 68. As a result, the engaged teeth of the known sprocket disks 60a, 60b have a tendency to pull the track below the downward pitch line 96. Consequently, when the sprocket disks 60a, 60b and track 30 disengage, the track bounces back toward and possibly beyond the desired track run causing track bounce, vibration of the vehicle 10, and undue wear of the track 30, sprocket teeth 61, and other drive components.

The present invention solves this problem by providing sprocket disks 60a, 60b that do not drivingly engage the track 30 past its ideal pitch lines 96, 98. This is accomplished by providing sprocket disks 60a, 60b that have more than two teeth drivingly engaging the track 30 along the pitch lines 96, 98 at any given time. As best shown in FIGS. 3 and 3A, sprocket disks 60a, 60b are approximately the same diameter as the known disks, however the pitch of the disks is smaller (e.g., preferably having a 4.75 inch pitch rather than the known 6.06 inch pitch) thereby providing more teeth, here nine teeth compared to the seven teeth of the known disks, for drivingly engaging the track 30. As best shown in FIG. 3A, the increased number of sprocket teeth results in more teeth, here at least three teeth 61a, 61b, 61c, drivingly engaging the track 30 at its apex 28. Also, because of the smaller pitch of the sprocket disks 60a, 60b over the known art, each tooth 61 of the sprocket disks 60a, 60b releases the track 30 at or before passing below the downward pitch line 96 of track 30, thereby preventing track bounce and track jump. The result, surprisingly, is a quiet, smooth-running, efficient, low-maintenance, substantially vibration-free endless track unit 26, without the need for slides, bridges or additional damper or guide wheels to control track bounce and jump.

In addition to preventing track bounce and track jump, providing more sprocket disk teeth 61 for drivingly engaging the track 30 requires the openings 112 formed between track belts 100 and wheel guides 90 to be closer together to permit the track 30 to properly mesh with the decreased pitch of the sprocket disks 60a, 60b. As a result, more traction bars 88 may be added to track 30, further increasing the traction of the vehicle 10. Also, because more sections of the track 30 are being drivingly engaged by the drive wheel 56, the forces applied to any particular section of track 30 and each sprocket tooth 61 are reduced over the known devices, thereby reducing the wear and elongation of these parts during use.

Because the improved sprocket disk effectively reduces track bounce and track jump, the need for placing sliders and bridges in the various gaps is eliminated. However, in order to protect the track 30 from derailment resulting from a severe disturbance, like from a foreign object falling on the track 30, it is still preferable to maintain the upstream and downstream damper wheels 72a, 72b with this preferred embodiment.

Moreover, because the improved sprocket disk minimizes track bounce, the sprocket teeth 61 can be "low profile," with minimal risk of track jump. For example, in an endless track unit of the invention having a sprocket wheel with the same drum diameter as a prior art sprocket wheel, the low-profile sprocket teeth 61 were over 36% shorter than the sprocket teeth of the prior art unit. The shorter sprocket teeth themselves help reduce the possibility of track bounce by releasing their engagement with the track 30 sooner than would otherwise occur. The low-profile teeth 61 also allow the damper wheels 72a, 72b to be placed closer to the drum 58 of the drive sprocket wheel than is possible with the longer teeth, further minimizing track bounce.

An alternative preferred embodiment of an endless track unit is shown in FIGS. 5–10. This embodiment provides a unique combination of drive wheel and track providing the advantages of the previously-described embodiment and additional advantages as well. As with the previous embodiment, the alternative embodiment provides drive sprocket disks with more than two teeth driving the track 282 along the pitch lines 296, 300 of the track 282 at any given time. However, this embodiment offers the improved features of the invention while eliminating altogether the need for damper wheels 72a, 72b (FIG. 2), offering an improved journal and spindle assembly, and providing a track 282 that reduces vibration to permit the vehicle to operate at increased speeds and with a more environmentally sensitive footprint.

Figure 5:
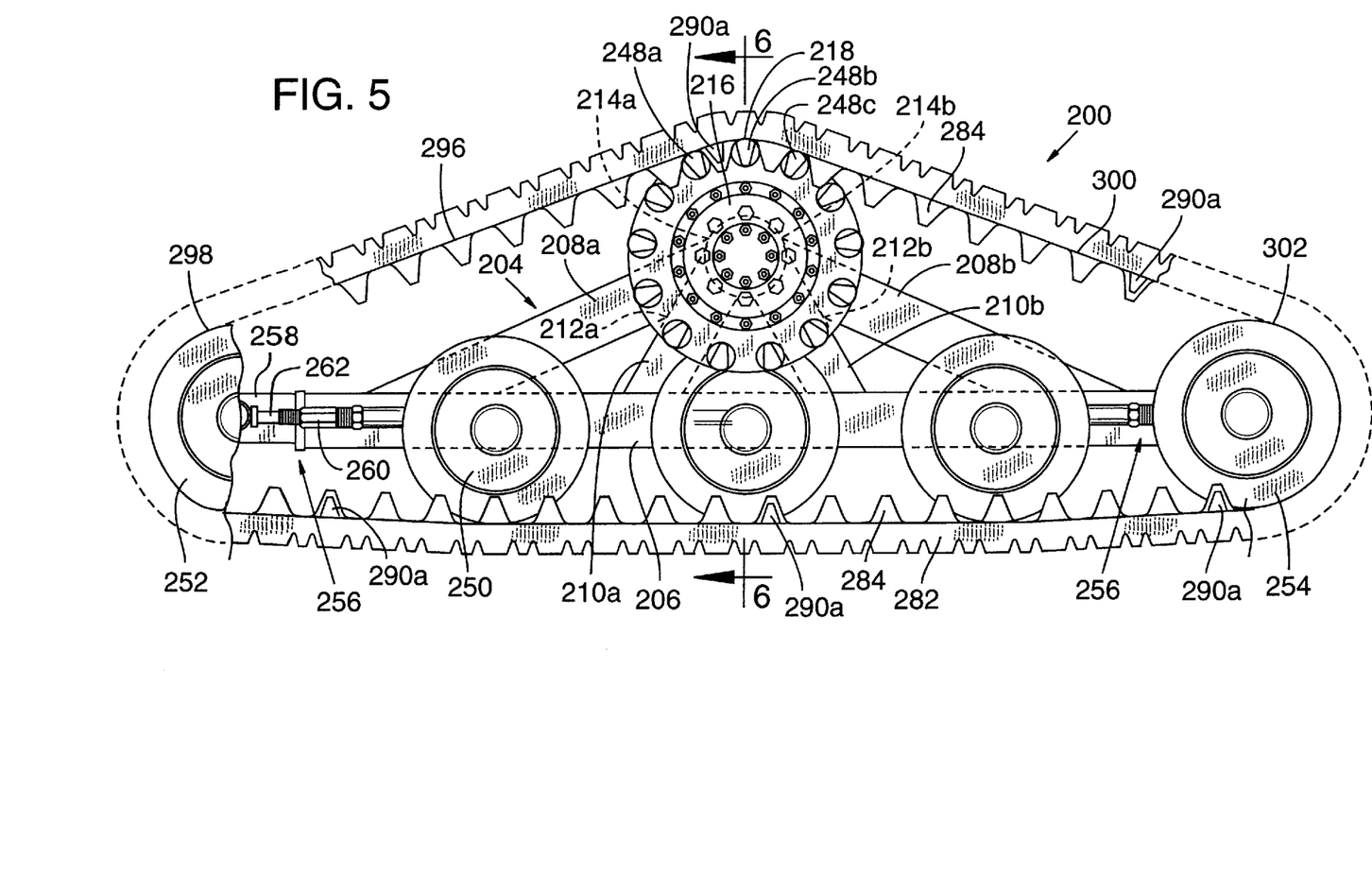
FIG. 5 is a side elevational view of an endless track unit of an alternative preferred embodiment.
Figure 6:
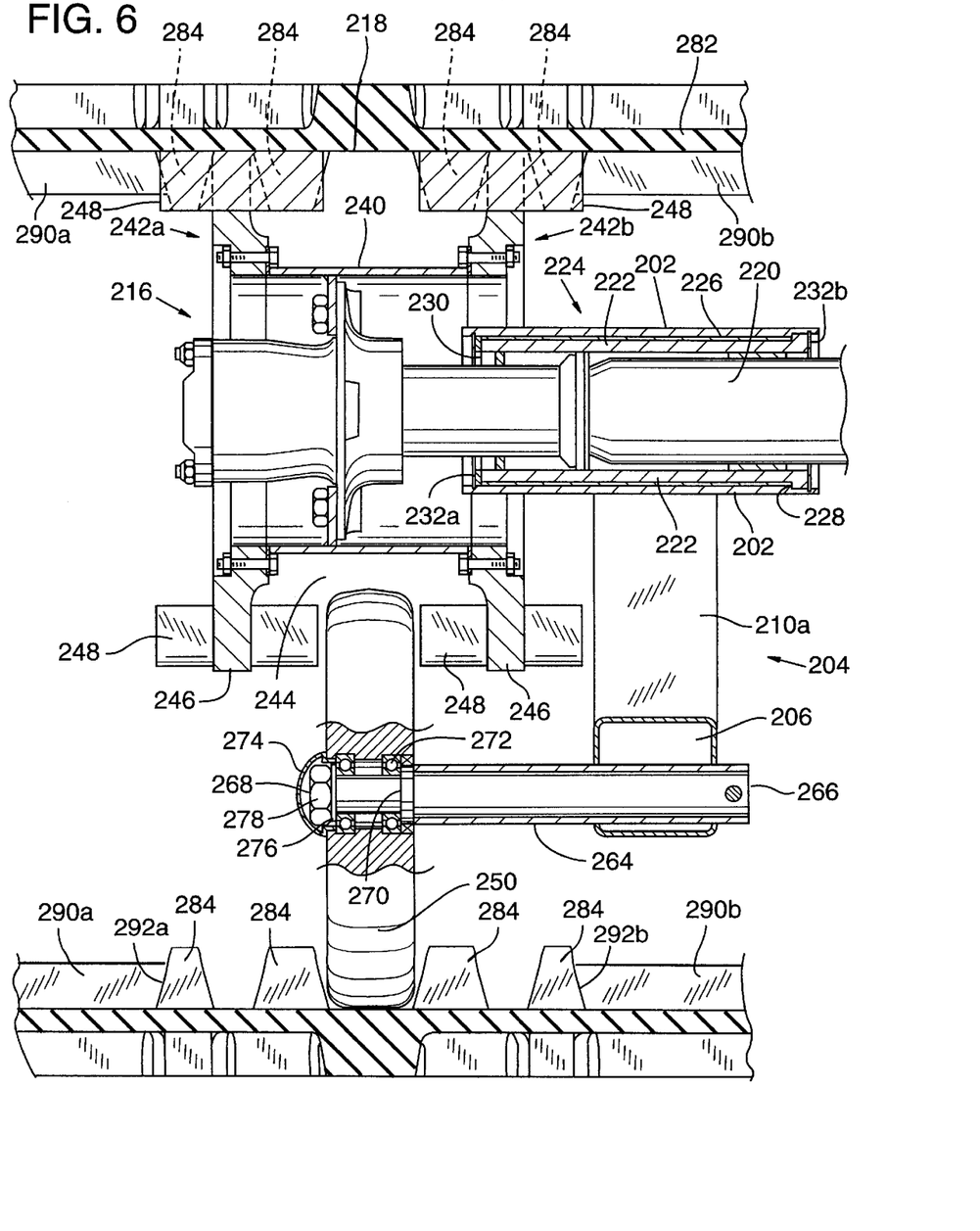
FIG. 6 is an enlarged cross-sectional view of the endless track unit of FIG. 5 taken along lines 6—6 of FIG. 5.

FIGS. 5 and 6 show one of the endless track units 200 of the alternative preferred embodiment in greater detail. The endless track unit 200 is mounted to the chassis 24 (FIG. 1) of the all-terrain vehicle 10 by an outer journal tube 202 (FIG. 6). A rigid frame 204 is mounted to outer journal tube 202. The frame 204 (more clearly shown in FIG. 5) includes a cross beam 206 and two sets of diverging legs—outer legs 208a, 208b and inner legs 210a, 210b.

The inner legs 210a, 210b are connected adjacent each other to outer journal tube 202 and diverge downwardly therefrom forming an inverted V-shaped configuration. The outer legs 208a, 208b include ends having lower parts 212a, 212b connected to the inner legs 210a, 210b, respectively, and upper parts 214a, 214b connected to outer journal tube 202. The outer legs 208a, 208b extend downwardly from the outer journal tube 202 and inner legs 210a, 210b forming another inverted V-shaped configuration. The inner legs 210a, 210b are further supported by gussets (not shown) mounted to outer journal tube 202 and outer legs 208a, 208b are similarly supported by gussets (not shown) mounted to the outer journal tube 202. The inner and outer legs are connected at their lower ends to cross beam 206, which runs longitudinally of the endless track unit 200. Two carrier stops (not shown), identical to the ones described in the previous embodiment, maintain the frame 204 in alignment with respect to the vehicle.

The endless track unit 200 has a drive wheel 216 located directly below apex 218 of the triangular-shaped endless track unit 200. Drive wheel 216 is rotatably driven by an axle 220 operably secured within inner journal tube 222, the axle 220 receiving power through a suitable transmission from the engine.

As best shown in FIG. 6, a journal assembly 224 contains a self lubricating replaceable journal liner 226, preferably nylon, that is removably secured between the outer journal tube 202 and inner journal tube 222. The journal liner 226 is retained by a ring 230, preferably steel, secured on the opposite side of the inner journal tube 222. Two snap rings 232a, 232b are inserted into grooves (not shown) in the outer journal tube 202 operably secure the outer journal tube 202 and inner journal tube 222 together with the journal liner 226 thereby secured therebetween. The journal liner 226 allows the frame 204 to oscillate about the inner journal tube 222 as with known devices, but it provides a way to replace a relatively inexpensive liner rather than a complete frame 204 when worn.

Drive wheel 216 includes a drum 240 with sprocket disks 242a, 242b mounted at either end of the drum 240 (FIG. 6). Opposed sprocket disks 242a, 242b are axially spaced-apart to form a gap 244 therebetween.

Figure 7:
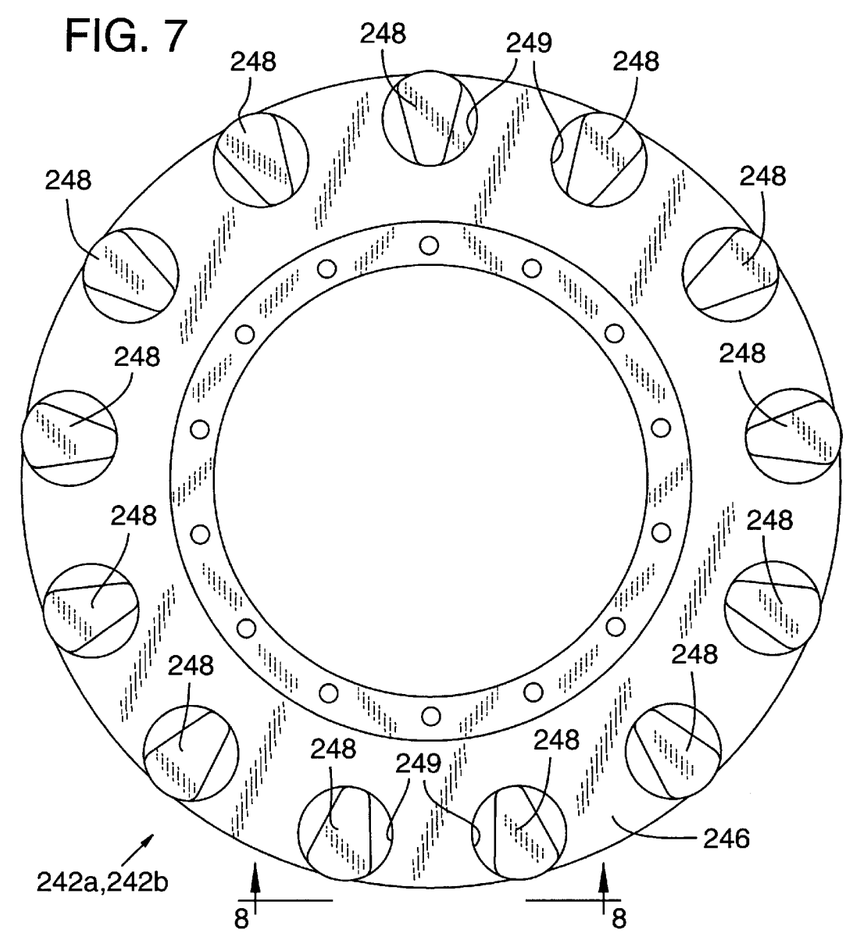
FIG. 7 is a side view of the drive sprocket wheel used in the embodiment of FIG. 5.
Figure 8:
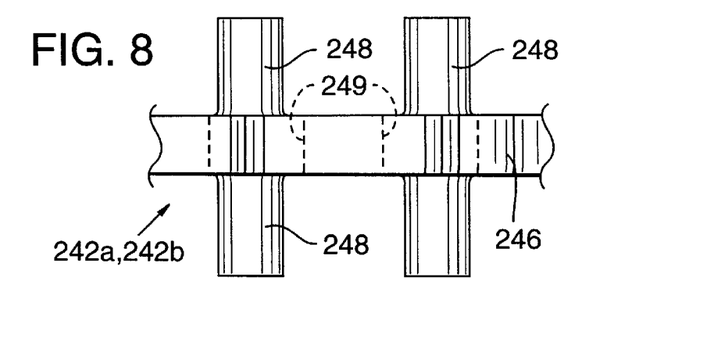
FIG. 8 is a top view of the drive sprocket wheel of FIG. 7.

As best shown in FIGS. 7 and 8, each sprocket disk 242a, 242b comprises a flat disk 246, preferably aluminium, with cogs 248, preferably thirteen of them and also aluminium, positioned equidistance around the circumference of the flat disk 246, with each cog 248 rigidly secured within a bore 249 of the flat disk 246, preferably by welding, and extending perpendicularly therefrom. The exposed area of each cog 248 has a generally tear-drop cross-section while the area of each cog secured within the bore 249 has a circular cross-section as shown in FIG. 7. Each cog 248 forms a tooth of the sprocket disk. Each sprocket disk is coated with a ⅛ inch to 3⁄16 inch thick coating of ice repellant material, preferably polyurethane, to prevent ice and other debris build-up on the sprocket disk during use.

Five lower undriven guide wheels 250 are equally spaced in a line along cross beam 206 of the generally triangular-shaped endless track unit 200 (FIG. 5) and including a front guide wheel 252 at one end and a rear guide wheel 254 at an opposite end. As shown in FIG. 5, the cross beam 206 includes a telescoping wheel end support 256, preferably one at each end of the cross beam 206. The telescoping wheel end support 256 includes a wheel extension beam 258 slidably received within and extending longitudinally from the cross beam 206. An adjustor nut 260 is rigidly secured to the cross beam 206 adjacent the wheel extension beam 258. A threaded adjustor bolt 262 is secured to wheel extension beam 258 and threadably received in the adjuster nut 260. Preferably, the adjuster bolt 262 is aligned with the center line of the guide wheels 250 to prevent uneven distribution of the forces acting on the guide wheels 250 and thereby reduce the likelihood of the guide wheels 250 falling out of alignment or experiencing uneven wear. By adjusting the adjuster bolt 262, the appropriate guide wheel 252, 254, here the front guide wheel 252, will move, permitting it to be adjusted forward or backward into a desired position to adjust tautness of the track 282.

Each guide wheel 250, is preferably made from a resilient material, such as rubber, to absorb vibration. The center guide wheels 250 rotate on guide wheel spindles 264 (FIG. 6) extending through an aperture in cross beam 206 and fixedly secured therein. The guide wheel spindles 264 for the front and rear guide wheels 252, 254 extend through apertures in the wheel extension beam 258. The cross beam 206 and wheel extension beam 258 maintain the guide wheels 250 in vertical and lateral alignment.

Each guide wheel spindle 264 has a first end 266, an opposite threaded end 268, and a shoulder 270 near threaded end 268 which serves as a bearing shoulder and a seal ring. Preferably, the outer diameter of the shoulder 270 is coated with a suitable ceramic paint, making for a hard and smooth seal surface. The guide wheel 250 is slidably mounted on the spindle 264 and rotate on bearings 272 (FIG. 6) encircling the spindle 264 and housed within the guide wheel 250. A pair of bearings and a guide wheel 250 are rotatably secured between shoulder 270 and hub 274 with a washer 276 and nut 278 threaded on threaded end 268 of the spindle as shown in FIG. 6. The shouldered spindle for receiving the bearing, reduces the number of parts required over the previous spindle assembly, permits each guide wheel 250 to be pre-loaded during manufacture, and increases the time between required greasing of the idler bearings from about 8 hours of operation to approximately 500 hours of operation.

Track 282 is trained about the outside of drive wheel 216, and guide wheels 250, 252, 254 to form a generally triangular-shaped track run. For each endless track unit 200, two sprocket disks 242a, 242b are aligned along and secured to the drive wheel 216.

Figures 9, 10:
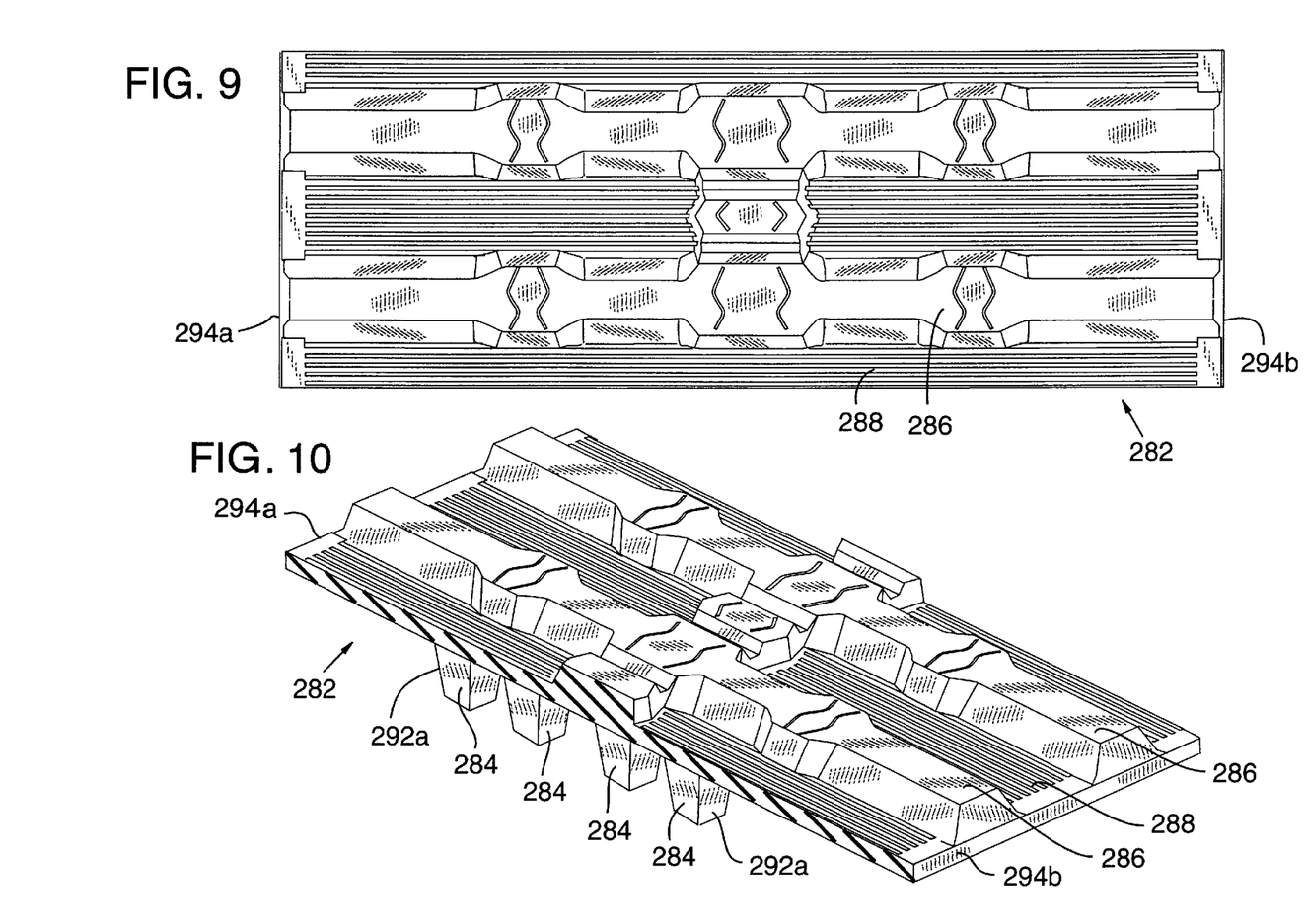
FIG. 9 is a top view of the track of FIG. 5.
FIG. 10 is a perspective view of the track of FIG. 9.

As best shown in FIGS. 6, 9 and 10, track 282 is a one piece endless molded rubber belt with internally cast composite stiffener rods (not shown), preferably fiberglass composite and positioned every 4.166 inches, running perpendicular to the track run. Internally cast flexible, stretch-resistant chords (not shown), preferably constructed of a combination of Kevlar, nylon, and steel cable, run parallel to the track run. One known manufacturer of endless tracks containing such materials is Camoplast, Inc., located in Plattsburgh, N.Y., United States of America.

Molded generally triangular shaped drive lugs 284, molded in place and preferably constructed of hard rubber, are positioned on the inside of track 282 to engage and mesh with the cogs 248 (See FIG. 5) for driving the track 282. As best shown in FIG. 5, the generally tear-drop shape of the cogs 248 allows each cogs 248 to drive the track close to the base of each drive lug 284. The drive lugs 284 are also spaced apart to serve as wheel guides. In use, the guide wheels 250, 252, 254 pass between the drive lugs 284 and maintain a central alignment of track 282 as it passes under the guide wheels 250, 252, 254 as shown.

As shown in FIGS. 9 and 10, a molded tread has traction bars 286, preferably of rubber, extending laterally across the outside of track 282, the traction bars 286 being equally spaced around the track's periphery. Lateral grooves 288 in the tread further improve the traction of the vehicle.

As shown in FIG. 6, a pair of scrapers 290a, 290b, preferably constructed of hard rubber, molded in place as part of the track, and having a generally triangular cross section, are positioned inside of the track 282. One scraper of the pair of scrapers, here scraper 290a, is positioned adjacent outer drive lug 292a and extends to outer track edge 294a as shown in FIGS. 6 and 10. Similarly, the other scraper of the pair of scrapers, here scraper 290b is positioned adjacent outer drive lug 292b and extends to outer track edge 294b. Preferably, the pair of scrapers 290a, 290b are positioned at every eighth set of drive lugs as shown in FIG. 5.

As best shown in FIG. 6, in use, the pair of scrapers 290a, 290b travel along the track path and extend toward the center of the generally triangular-shaped track run with one scraper of the pair of scrapers, here scraper 290b, extending toward the journal assembly 224. As snow, ice, sand, or other debris builds up in the area about the journal assembly 224, the scraper extending toward the journal assembly 224 clears away this debris before it can disrupt operation of track 282.

In the configuration shown in FIG. 6, the other scraper of the pair of scrapers, here scraper 290a, does not operate to clear debris. However, for ease of installation and for reducing the likelihood of uneven wear of the track, the track is reversible so that either outer track edge 294a, 294b of the track may be positioned toward the center of the vehicle 10. In the event the track were installed in reverse as described, the other scraper, here scraper 290a, would then be positioned over the journal assembly 224. The pair of scrapers 290a, 290b permit the efficient clearing of debris about the journal assembly, while still allowing the track to remain completely reversible.

As best shown in FIG. 5, an ideal downward pitch line 296 of track 282 is defined as a down-sloping straight line extending from the apex 218 to a point 298 tangent to the upper portion of the front guide wheel 252. Similarly, an ideal upward pitch line 300 of track 282 is defined as an up-sloping straight line extending from a point 302 tangent to the upper portion of the rear guide wheel 254 to the apex 218.

This alternative preferred embodiment operates much the same as the first preferred embodiment. More than two teeth, here three cogs 248a, 248b, 248c (FIG. 5), drivingly engage the track 282 along its pitch lines 300, 296. Accordingly, as more fully described with the previously described preferred embodiment, the tendency of the sprocket disk 242a, 242b to remain drivingly engaged with the track 282 below the downward pitch line 296 is eliminated and track bounce and track skip are eliminated.

In addition, because of the improved materials used in the track 282, the track 282 is stretch resistant during use and wear. Unlike traditional rubber tracks, the stretch-resistant chords and stiffener rods embedded within the improved track 282 significantly reduce the likelihood of the track 282 stretching during use. Accordingly, the track 282 may be installed taut, with little chance of it loosening during use and little chance of the drive lugs 284 falling out of alignment with their corresponding cogs. The track 282 may be pulled taut simply by adjusting the telescoping wheel end support 256, which also permits easy removal and replacement of track 282. With this improved configuration, the need for sliders, bridges, and damper wheels is eliminated.

The stretch-resistent track 282 combined with the increased number of teeth, as well as increased surface area of each tooth contacting the lugs 284, permit each disk to more evenly distribute the forces acting on the track 282. As a result, track 282 is more reliable and less prone to falling out of alignment or wearing out compared to the known track and sprocket disk configurations.

Also, because cogs 248 drivingly engage the lugs 284 on the inside of the track 282, rather than through openings in the track as with known previous devices, the need for holes extending through the track to accommodate sprocket teeth is eliminated. Accordingly, the track 282 may be and is preferably a continuous rubber surface, thereby offering a much larger surface area contacting the ground at any given time. In addition to the improved traction associated with such a configuration, another benefit includes the fact the weight of the vehicle is more widely and evenly distributed on the ground, resulting in the track 282 becoming less deeply imbedded in the ground as the vehicle travels over it. As a result, the track 282 leaves a smaller and less disruptive footprint behind. Such a small footprint permits the vehicle to operate in environmentally sensitive areas without unduly disrupting the terrain.

Also, elimination of steel traction bars in the alternative preferred embodiment allows the vehicle to operate relatively vibration free even at high speeds on hard surfaces.

Having described and illustrated the principles of the invention with reference to preferred embodiments thereof, it will be apparent that these embodiments can be modified in arrangement and detail without departing from the principles of the invention.

For example, although the sprocket disks have been shown to have nine and thirteen teeth, any sized or shaped sprocket disk that permits more than two teeth to drivingly engage the track and release it at or above the downward pitch line could be used.

Additionally, although the endless track unit 26 of the first embodiment is shown with two damper wheels 72a, 72b (FIG. 2), it can easily be modified to have only one damper wheel. In the one damper wheel embodiment, the damper could be on the upstream or the preferable downstream side. Moreover, although the damper wheels are shown nested close to the drive wheel, they could be located further downstream and upstream. Also, the improved journal assembly having a removable journal liner, the improved guide wheel spindle, and the addition of ice scrapers discussed in conjunction with the alternative preferred embodiment are equally applicable to the first preferred embodiment.

Finally, although the drive wheel was shown as a dual-sprocket wheel, it is possible to have other forms of drive wheels, such as a single sprocket wheel.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed is:

1. An endless track unit for a four-track tracked vehicle, the track unit comprising:

a track frame;

a single track drive sprocket wheel having a drive sprocket with multiple sprocket teeth, said sprocket wheel being rotatably mounted on the frame;

plural in-line guide wheels rotatably mounted on the frame below the drive sprocket wheel, the guide wheels including front- and rear-most guide wheels;

an endless track trained about the drive and guide wheels and defining a generally triangular-shaped track run with the sprocket wheel at the apex of the run, and a downward pitch line extending in a straight line from the apex to the upper outer periphery of the front most guide wheel along the track run, said track being in driving engagement with more than two teeth of the drive sprocket at the apex such that said teeth disengage said track before the teeth rotate below said downward pitch line, thereby preventing track bounce and track jump.

2. The endless track unit of claim 1, wherein said track is a one-piece stretch-resistant belt.

3. The endless track unit of claim 1, wherein said track includes drive lugs for drivingly engaging said sprocket wheel.

4. The endless track unit of claim 1, further including a damper wheel rotatably mounted on the frame along the track run between the drive sprocket wheel and front guide wheel and rotatably supporting the track in its track run.

5. The endless track unit of claim 1, wherein said drive sprocket has low profile teeth.

6. The endless track unit of claim 1, wherein said drive sprocket has 9 teeth.

7. The endless track unit of claim 1, wherein said drive sprocket has 13 teeth.

8. The endless track unit of claim 1, wherein said drive sprocket includes a disk with teeth formed from cogs secured at equally spaced intervals about an outer portion of the disk.

9. The endless track unit of claim 8, wherein said cogs have a generally tear-shaped cross-section.

10. The endless track unit of claim 9, wherein said drive sprocket has 13 cogs.

11. The endless track unit of claim 1, wherein said drive sprocket wheel includes a drum with drive sprockets mounted, one on each of opposite ends of the drum.

12. The endless track unit of claim 11, wherein each said drive sprocket has 9 teeth.

13. The endless track unit of claim 11, wherein each said drive sprocket includes a disk with teeth formed from cogs extending laterally from the disk and secured at equally spaced intervals about an outer portion of the disk.

14. The endless track unit of claim 13, wherein each said cog has a generally tear-shaped cross-section for drivingly engaging said track.

15. The endless track unit of claim 14, wherein each said drive sprocket has 13 cogs.

16. The endless track unit of claim 1, wherein a guide wheel is secured to said frame with a spindle, said spindle having a shoulder for securing a bearing thereon.

17. The endless track unit of claim 1, wherein said track further includes a scraper for removing debris collected around said frame during operation of the vehicle.

18. The endless track unit of claim 1, wherein said scraper is an elongate member having a generally triangular cross section secured to said track and extending inward toward said guide wheels.

19. An endless track unit according to claim 1, wherein the track has inwardly projecting lugs for drivingly engaging the sprocket teeth, and a continuous imperforate surface for optimum distribution of the vehicle weight and for minimizing impact on the terrain.

20. The all-terrain vehicle of claim 19, wherein the sprocket teeth are cogs secured at equally spaced intervals about an outer portion of the sprocket wheel.

21. The endless track unit of claim 20, wherein each said cog extends laterally from the sprocket wheel and has a generally tear-shaped cross-section for drivingly engaging said lugs.

22. The vehicle of claim 19, wherein the teeth project laterally from the sprocket wheel to engage the lugs.

23. The endless track unit of claim 19, wherein each said sprocket wheel includes 13 teeth.

24. The endless track unit of claim 19, wherein said sprocket disk is coated with an ice repellant material thereby preventing ice and other debris build-up on the sprocket disk during use.

25. A method for reducing vibration in the endless track unit of claim 1, the method comprising:
configuring the endless track unit as a one-piece stretch-resistant belt having drive lugs spaced at equal intervals around the inside of the track;
driving the belt in the generally triangular-shaped track run forming a pitch line with the sprocket wheel located at the apex of the track run;
providing the belt with a sufficient number of lugs and the sprocket wheel with a sufficient number of circumferential sprocket teeth such that more than two of the sprocket teeth drivingly engage a corresponding number of lugs on the belt as the belt passes over the sprocket wheel.

26. The endless track unit of claim 1, wherein the track comprises an endless, continuous stretch-resistant imperforate belt having inwardly projecting lugs for drivingly engaging the sprocket teeth.

27. The endless track unit of claim 1, wherein said drive sprocket is coated with an ice repellant material thereby preventing ice and other debris build-up on the drive sprocket during use.

28. The endless track unit of claim 27, wherein said ice repellant material is polyurethane.

29. The endless track unit of claim 28, wherein said drive sprocket is coated with a ⅛ inch to 3/16 inch thick coating of polyurethane.

30. The endless track unit of claim 1, wherein the track includes a single one-piece stretch-resistant non-metallic belt with integral inwardly projecting drive lugs, and wherein the teeth of said sprocket wheel comprise cogs, and further wherein the sprocket wheel is coated with a non-metallic, heat-insulating material to prevent ice build-up on said cogs.

31. The endless track unit of claim 30, wherein said drive lugs and cogs are of sufficient number that more than two cogs drivingly engage the drive lugs at any given time.

32. The endless track unit of claim 31, wherein said cogs are tear-drop shaped.

33. The endless track unit of claim 30, wherein said non-metallic, heat-insulating material is polyurethane.

34. The endless track unit of claim 33, wherein the belt comprises an imperforate molded rubber material.

35. The endless track unit of claim 30 wherein the drive lugs are arranged in laterally spaced apart pairs about the interior of the belt, and wherein each cog comprises a pair of laterally spaced apart cog elements arranged such that a pair of cog elements drivingly engages a corresponding pair of lugs at the same time.

36. An endless track unit for a four-track tracked vehicle the track unit comprising:
a track frame rigidly secured to an outer journal tube;
a track drive sprocket wheel having a drive sprocket with multiple sprocket teeth, said sprocket wheel being rotatably mounted on the frame and secured to a drive axle;
plural in-line guide wheels rotatably mounted on the frame below the drive sprocket wheel, the guide wheels including front- and rear-most guide wheels;
an endless track trained about the drive and guide wheels in driving engagement with the drive sprocket wheel and defining a generally triangular track run with the sprocket wheel positioned at the apex of the run;
the generally triangular configuration of the track run and the drive sprocket and track being constructed and arranged such that more than two sprocket teeth drivingly engage the track at any given time;
an inner journal tube, operable engaging said axle, and received within said outer journal tube; and
a replaceable journal liner between said inner and outer journal tubes to reduce wear and ease maintenance of the frame and inner and outer journal tubes.

* * * * *

UNITED STATES PATENT AND TRADEMARK OFFICE
CERTIFICATE OF CORRECTION

PATENT NO. : 6,007,166
DATED : December 28, 1999
INVENTOR(S) : Emmitt M. Tucker, Jasper J. Tucker, Jr. and Maralee V. Sullivan It is certified that error appears in the above-identified patent and that said Letters Patent is hereby corrected as shown below:

<u>Claims, column 16,</u>
Line 22, delete "vehicle" and insert -- vehicle, --.
Line 42, delete "operable" and insert -- operably --.

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*